United States Patent
Ericsson

(10) Patent No.: US 11,162,228 B2
(45) Date of Patent: Nov. 2, 2021

(54) APPARATUS AND SYSTEM FOR SECURING A CUTTING DEVICE

(71) Applicant: HUSQVARNA AB, Huskvarna (SE)

(72) Inventor: Daniel Ericsson, Olofstorp (SE)

(73) Assignee: HUSQVARNA AB, Huskvarna (SE)

( * ) Notice: Subject to any disclaimer, the term of this patent is extended or adjusted under 35 U.S.C. 154(b) by 109 days.

(21) Appl. No.: 14/888,565

(22) PCT Filed: May 7, 2013

(86) PCT No.: PCT/SE2013/050504
§ 371 (c)(1),
(2) Date: Nov. 2, 2015

(87) PCT Pub. No.: WO2014/182203
PCT Pub. Date: Nov. 13, 2014

(65) Prior Publication Data
US 2016/0108583 A1    Apr. 21, 2016

(51) Int. Cl.
*B23D 45/04* (2006.01)
*E01B 31/04* (2006.01)
*B23D 45/00* (2006.01)

(52) U.S. Cl.
CPC ............ *E01B 31/04* (2013.01); *B23D 45/006* (2013.01); *B23D 45/042* (2013.01)

(58) Field of Classification Search
CPC ..... E01B 31/04; B23D 45/006; B23D 45/042; B23D 45/04; B24B 27/08
See application file for complete search history.

(56) References Cited

U.S. PATENT DOCUMENTS

| 3,974,596 A | 8/1976 | Huboud-Peron |
| 4,033,074 A | 7/1977 | Lutts |
(Continued)

FOREIGN PATENT DOCUMENTS

| CA | 2256806 A1 | 10/1999 |
| CN | 101092021 A | 12/2007 |
(Continued)

OTHER PUBLICATIONS

International Search Report and Written Opinion for International Application No. PCT/SE2013/050504 dated Jan. 30, 2014.
(Continued)

*Primary Examiner* — Kenneth E Peterson
*Assistant Examiner* — Liang Dong
(74) *Attorney, Agent, or Firm* — Burr & Forman, LLP

(57) ABSTRACT

The invention relates to an apparatus arranged to secure a portable cutting machine on an elongated profiled object, said apparatus comprising a base adapted to be disposed on an upper surface of the profiled object and at least one arm mounted to the base at right angles to the main extension of said object; the base comprising two parallel, spaced plates with an opening for receiving the object; each plate comprising a central, first contact surface arranged to contact the upper surface of the object; and a second inwardly angled contact surface extending from a first end of the plate towards a corresponding side surface of the object; that the base further comprises a rocker arm having a first end, a central portion and a second end; which rocker arm is mounted pivotable about a first axis at right angles to the parallel plates.

18 Claims, 6 Drawing Sheets

(56) References Cited

U.S. PATENT DOCUMENTS

| | | | | |
|---|---|---|---|---|
| 4,873,902 A * | 10/1989 | Krieg | ............... | B23D 45/006 |
| | | | | 269/32 |
| 5,545,079 A * | 8/1996 | Larsson | ............ | B23D 45/006 |
| | | | | 125/13.01 |
| 6,234,889 B1 * | 5/2001 | Huboud Peron | .... | B23D 45/006 |
| | | | | 125/12 |
| 6,745,804 B2 * | 6/2004 | Welsh | ................. | B25H 1/04 |
| | | | | 144/287 |
| 7,926,771 B2 * | 4/2011 | DeMartine | ......... | F16M 13/022 |
| | | | | 248/218.4 |
| 8,002,253 B2 | 8/2011 | Thomas et al. | | |
| 8,789,521 B2 | 7/2014 | Jonsson | | |
| 2007/0266837 A1 | 11/2007 | Nickels et al. | | |
| 2010/0317498 A1 * | 12/2010 | Mallookis | ............ | E04H 15/50 |
| | | | | 482/148 |

FOREIGN PATENT DOCUMENTS

| | | | |
|---|---|---|---|
| CN | 102066030 | A | 5/2011 |
| CN | 102481644 | A | 5/2012 |
| EP | 0950482 | A2 | 10/1999 |
| FR | 2267418 | A1 | 11/1975 |
| FR | 2419140 | A1 | 10/1979 |
| SU | 810871 | A1 | 3/1981 |
| WO | 2011067262 | A1 | 6/2011 |

OTHER PUBLICATIONS

International Preliminary Report on Patentability for International Application No. PCT/SE2013/050504, dated Nov. 10, 2015.

\* cited by examiner

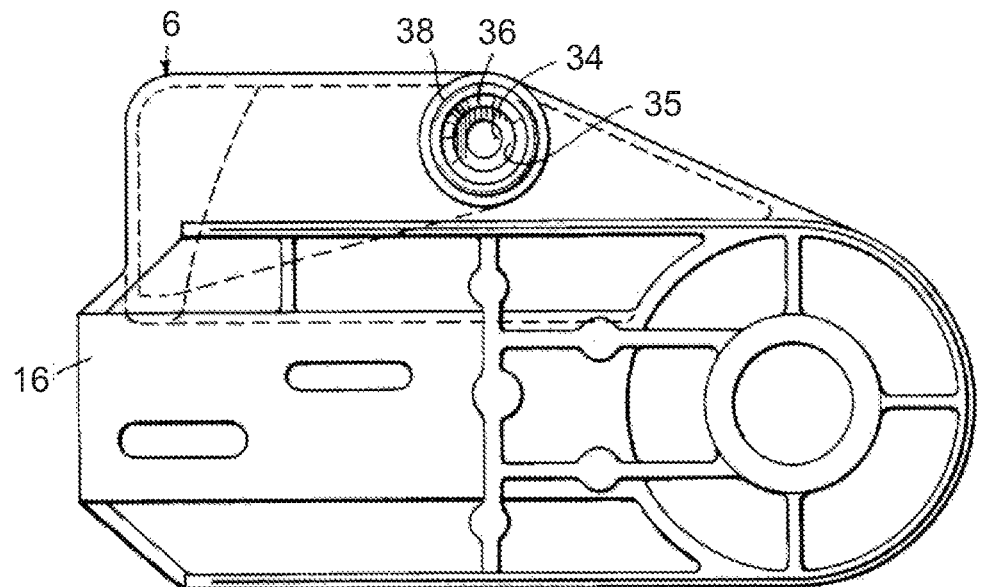
Fig.3
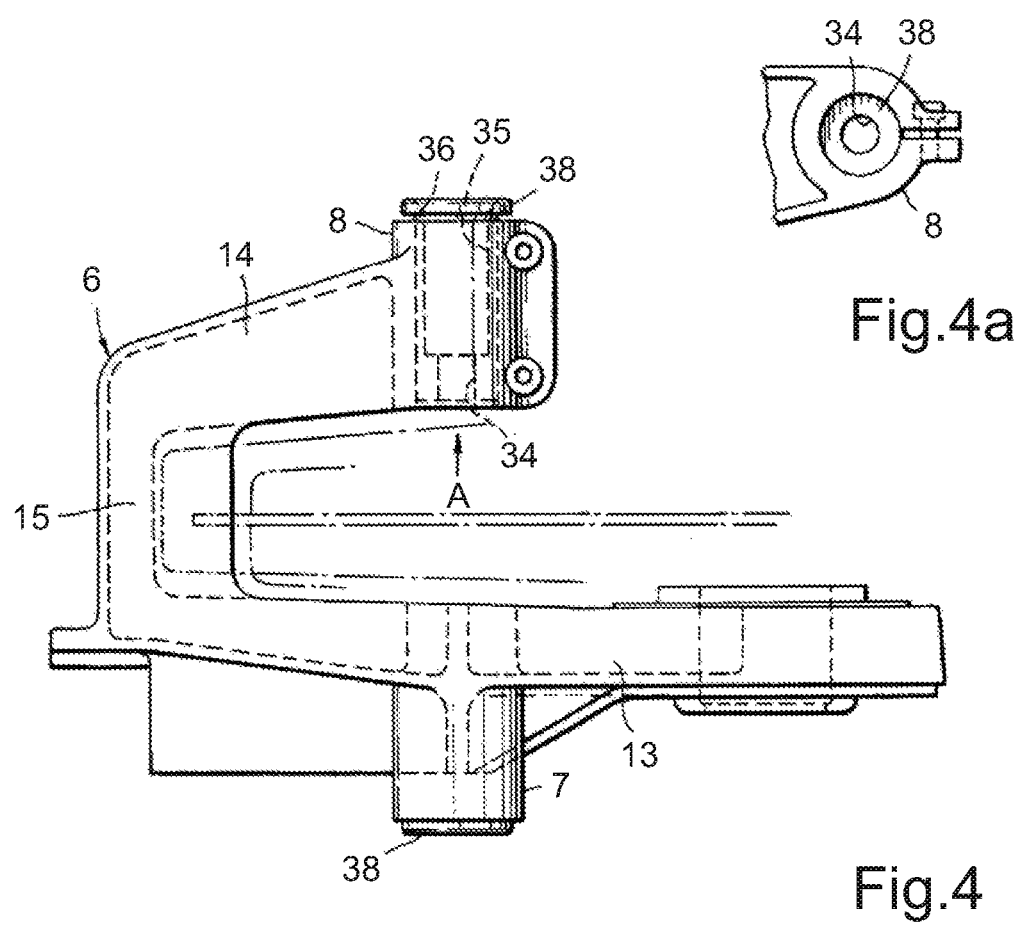
Fig.4a
Fig.4

APPARATUS AND SYSTEM FOR SECURING A CUTTING DEVICE

TECHNICAL FIELD

The invention relates to an apparatus arranged to secure a portable, hand-operated machine, having a circular cutting wheel or saw blade which is rotatable about a centre of rotation. The portable machine can comprise a double-armed holder with a rear arm which, at its free, rear end, is connected to the machine at a first hinge, rotatable about a first axis of rotation parallel to the axis of rotation of the cutting wheel or the saw blade, and, at the other end, is connected rotatably, by means of a toggle joint, to a front arm which in turn is connected rotatably, at its front, free end, to a securing device about a second axis of rotation at a second hinge. The securing apparatus is arranged for anchoring the holder and the machine onto the object which is to be cut or sawn, for the purpose of ensuring that the machine with the cutting wheel or the saw blade will be able to be displaced relative to the said object at right angles to the axis of rotation during turning of the arms at the said first and second hinges and at the said toggle joint.

BACKGROUND OF THE INVENTION

Apparatuses of the type described above are used, inter alia, in order to cut a railroad rail at right angles to the longitudinal direction of the rail. The securing device in this case consists of a vice which is mounted on the rail.

A known securing device is shown in U.S. Pat. No. 5,545,079, in which a machine is clamped onto the object which is to be cut by means of a securing device in the form of a vice actuated by a manually actuated screw. The vice comprises a pair of parallel jaws with U-shaped openings having substantially the same shape as the rail onto which it is clamped. The vice is placed over the rail at right angles thereof and the screw is tightened until the securing device is clamped to the rail.

One disadvantage with this design is that it uses a pointed screw in order to attach to the rail that is to be cut. The screw leaves an imprint in the rail, which imprint that may act as a crack-initiation. Furthermore, the mounting of the attachment requires prior knowledge of its function. A non-experienced user may mount the attachment incorrectly, which may lead to the attachment coming loose during the cut. Also, in case of a worn rail problems may arise if the U-shaped openings of the jaws do not match the profile of the rail, making it difficult, if not impossible to use the known attachment.

The object of the invention is to provide an improved apparatus for securing a portable, hand-operated machine for cutting elongated profiled objects that solves the above problems.

INVENTION

The above problems have been solved by an apparatus and a system as claimed in the appended claims.

Apparatuses of the type described above are used, inter alia, in order to cut elongated profiled objects such as a railroad rail at right angles to the longitudinal direction of the elongated profiled object. The object is preferably, but not necessarily, an elongated profile with a substantially I- or T-shaped cross-section, where the apparatus is arranged to be clamped onto the enlarged portion thereof.

According to a preferred embodiment, the invention relates to an apparatus arranged to secure a portable cutting machine on an elongated railshaped profiled object, having a rail head with side portions and lower edges, said apparatus comprising a base adapted to be disposed on an upper surface of the profiled object and at least one arm mounted pivotable an arm pivot axis of the base at right angles to the main extension of said object; the base comprising two parallel, spaced plates with an opening for receiving the object; each plate comprising a central, first contact surface arranged to contact the upper surface of the object; and a second inwardly angled contact surface extending from a first end of the plates towards a corresponding side surface of the object, and arranged to contact a first lower edge of the rail head.

According to the invention the base further comprises a rocker arm having a first end, a central portion and a second end. The rocker arm is mounted pivotable about a first axis at right angles to the parallel plates between a second end of each plate, which first pivot axis is arranged through the central portion of the rocker arm.

The first end of said rocker arm comprising a third contact surface opposed to the respective second contact surfaces and extending towards a corresponding opposed side surface of the object, wherein the third contact surface of the rocker arm is arranged to be displaced towards a second lower edge of the rail head to clamp the profiled object, the clamping forces towards the lower edges are directed in a combined both lateral and vertical direction;

When the apparatus is clamped to the object, each of the second and third contact surfaces are angled inwardly relative to a plane through the object in its main extension and at right angles to the first contact surfaces.

A clamping device is provided for actuating the rocker arm, where one end of the clamping device is mounted pivotable about a second axis at right angles to the parallel plates between their first and second ends. The second end of the rocker arm is journalled relative to a pivot on the clamping device, which pivot is located on a third axis parallel to and remote from the second axis.

The second end of the rocker arm is releasably mounted to the pivot on the clamping device. This can be achieved, for instance, by providing a semi-circular recess in the second end of the rocker arm facing the pivot. The pivot on the clamping device can be a cylindrical section that can be placed in the recess. According to one example, the clamping device can be provided with one pivot on either side, arranged to cooperate with a pair of recesses located on a forked portion of the second end of the rocker arm, which forked portion can extend on both sides of the clamping device. An advantage of this arrangement is that the clamping device only needs to be released a distance corresponding to the depth of the recess in order to release the apparatus from the object. When the pivot(-s) on the clamping device clears the recess(-s) it can be swung aside, allowing the rocker arm to be rotated to clear the object as the apparatus is removed.

The displacement of the clamping device is achieved by mounting it to an attachment that is pivotable about the second axis. The end of the clamping device proximate the second axis comprises an actuator arranged to displace the rocker arm pivot relative to the second axis, thereby forcing the third contact surface at the first end of said rocker arm into contact with the object.

The actuator can comprise a screw, which when rotated is arranged to displace the second end of the rocker arm relative to the second axis and the attachment. The screw can be arranged to cooperate with a tubular, internally threaded member comprising the pivot for the second end of the rocker arm. When the second end of the rocker arm is in contact with the pivot on the tubular member of the clamping device, rotation of the screw causes a relative displacement of the tubular member along the screw.

Alternatively, the actuator can comprise a piston-cylinder arrangement, which can be hydraulically or pneumatically actuated. In this case, the hydraulic cylinder can comprise the pivot or pivots for the second end of the rocker arm.

The above-mentioned at least one arm has a free end, remote from the plates that provides an attachment point for the cutting machine. According to a further example, said arm and the clamping device are both mounted to and pivotable about the second axis. The second axis is located adjacent the first contact surface at a distance, measured at right angles from said surface, not greater than the distance between the first and third axes. This arrangement is used in order to minimize the effect of any torque induced to the clamped apparatus during displacement of the cutting machine relative to the object.

The invention further relates to a system using a securing device in the form of the above apparatus. According to the invention, the system comprises a plurality of separately usable and interchangeable components for cutting, sawing or slicing through objects, the system comprises a first component with a cutting wheel having a central drive shaft, at least one second component with a circular saw blade with a centerless driving, a holder and a securing device which is common to both the first and second components. The holder has a rear arm and a front arm, the rear arm having a free, rear end that can be connected to either component at a first hinge. A first spindle having a first extension piece is arranged at said first hinge. The rear arm is rotatable about a first axis of rotation parallel to the center of rotation of the cutting wheel or the circular saw blade, respectively. The rear arm also has a front end rotatably connected, by means of a toggle joint, to a rear end of said front arm. The front arm has a front, free end rotatably connected about a second axis of rotation at a second hinge for anchoring the holder and, thus, the respective component, on the object which is to be cut or sawn. When clamped in position, the first component with the cutting wheel or the second component with the saw blade is capable of being displaced relative to the said object at right angles to the first axis of rotation during turning of the arms at the said first and second hinges and at the said toggle joint. The centerline of the said first axis of rotation intersects a plane of rotation of the cutting wheel or the circular saw blade, respectively, at a point between the center of rotation of the cutting wheel or saw blade and a periphery of the cutting wheel or saw blade. At least two separately usable securing devices, which are exchangeable with one another, can be provided. Each securing device has at least one spindle attachment which can accommodate a second extension piece on a second spindle arranged at the said second hinge at the front end of the front arm of the holder, which second extension piece extends outwards from said second spindle in an opposite direction compared to the first extension piece, of the first spindle at the first hinge.

One object of the system according to the invention is to provide a system where the arms of the holder have a comparatively smaller relative length in relation to the diameter of the cutting wheel. In accordance with a first aspect of the invention, this is achieved by the fact that the centre line of the said first axis of rotation intersects, in its continuation, the cutting wheel, the saw blade or the space possibly present inside the saw blade, if the latter is annular, at a point between the centre of rotation of the cutting wheel or saw blade and the periphery.

In the present invention, the requirement for optional anchoring of the extension piece of the spindle from one or other direction in the machine is also satisfied. This object is achieved by the fact that the attachments for the spindle are arranged in the machine on both sides of the plane of the cutting wheel or the circular saw blade, in which case the spindle attachments can be arranged opposite one another in such a way that their centre lines coincide, or, alternatively, are arranged on both sides of the cutting wheel, not opposite one another, but instead offset, so that their centre lines do not coincide, but are parallel to each other, which in certain cases can be an advantage.

Securing devices have also been developed within the context of the invention, including a securing device for mounting the holder, in conjunction with the sawing of long cuts, for example, in a wall. For instance, the device according to the invention can be clamped to the end of an elongated object forming a fixture, whereby the holder allows the cutting machine to be displaced from one end position, past the fixture to a second end position.

Further characteristics and features of, and advantages deriving from the invention are indicated in the attached patent claims and from the description which follows.

FIGURES

In the following text, the invention will be described in detail with reference to the attached drawings. These schematic drawings are used for illustration only and do not in any way limit the scope of the invention. In the drawings:

FIG. 3 shows a side view of a holder-fastening yoke;

FIG. 4 shows a view from above of the same holder-fastening yoke, a pair of spindle attachments included in the yoke being shown in cross-section;

FIG. 4A shows a view in the direction of the arrow A in FIG. 4;

DETAILED DESCRIPTION

Figure 1:
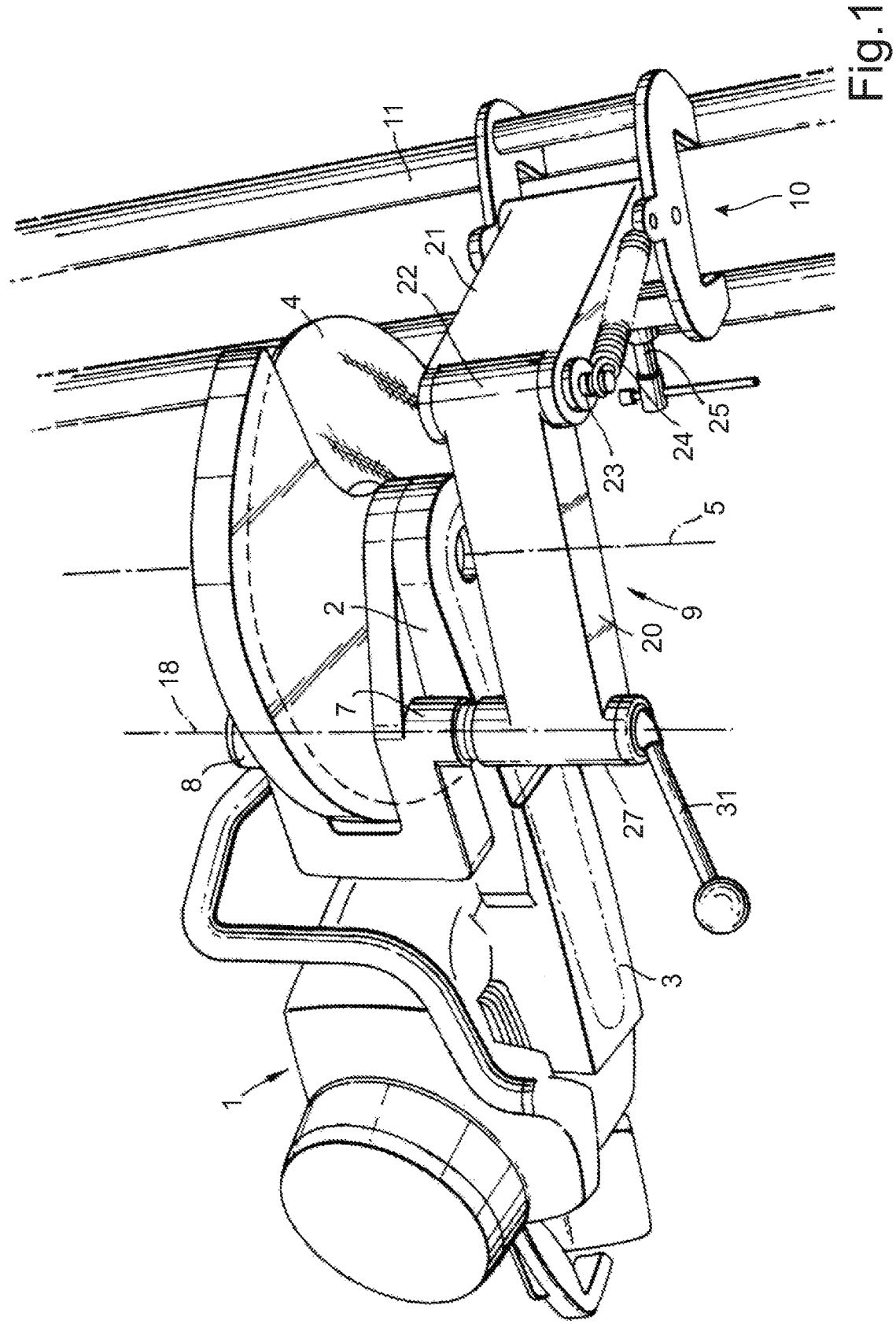
FIG. 1 shows a perspective view of an apparatus according to the invention on a cutting machine.

First, with reference to FIGS. 1-5, a cutting machine driven by a combustion motor is designated generally by the reference 1. A cutting arm 2 is arranged on the cutting machine. In the cutting arm there is a drive chain or drive belt 3, which drives a cutting wheel 4 via a central shaft (not shown) about a centre of rotation 5. A holder-fastening yoke 6 is mounted on the cutting arm 2, and a rotatable holder 9 is fastened in a spindle attachment 7. A second spindle attachment is designated by 8. The holder 9 is in turn rotatably secured on a rail 11 with the aid of a securing device 10 which consists, in a known manner, of a screw vice.

The holder-fastening yoke 6, FIGS. 3 and 4, has a longer branch 13 on the right-hand side of the cutting wheel 4, a shorter branch 14 on the left-hand side of the cutting wheel, and a rib 15 behind the cutting wheel 4, which rib 15 connects the two branches 13 and 14 to one another. Furthermore, a securing plate 16 is arranged under the longer branch 13 and covers the front part of the cutting arm 2 and is joined to the latter.

According to the embodiment, the two spindle attachments 7, 8 are coaxial, that is to say are arranged with a common axis opposite one another on both sides of the cutting wheel 4 and at a level above the cutting arm 2. The spindle attachments 7, 8 are furthermore arranged so far forward that their common centre line 18 intersects the cutting wheel 4 at a point behind the centre of rotation 5, between the said centre of rotation and the periphery of the cutting wheel 4.

Figure 2:
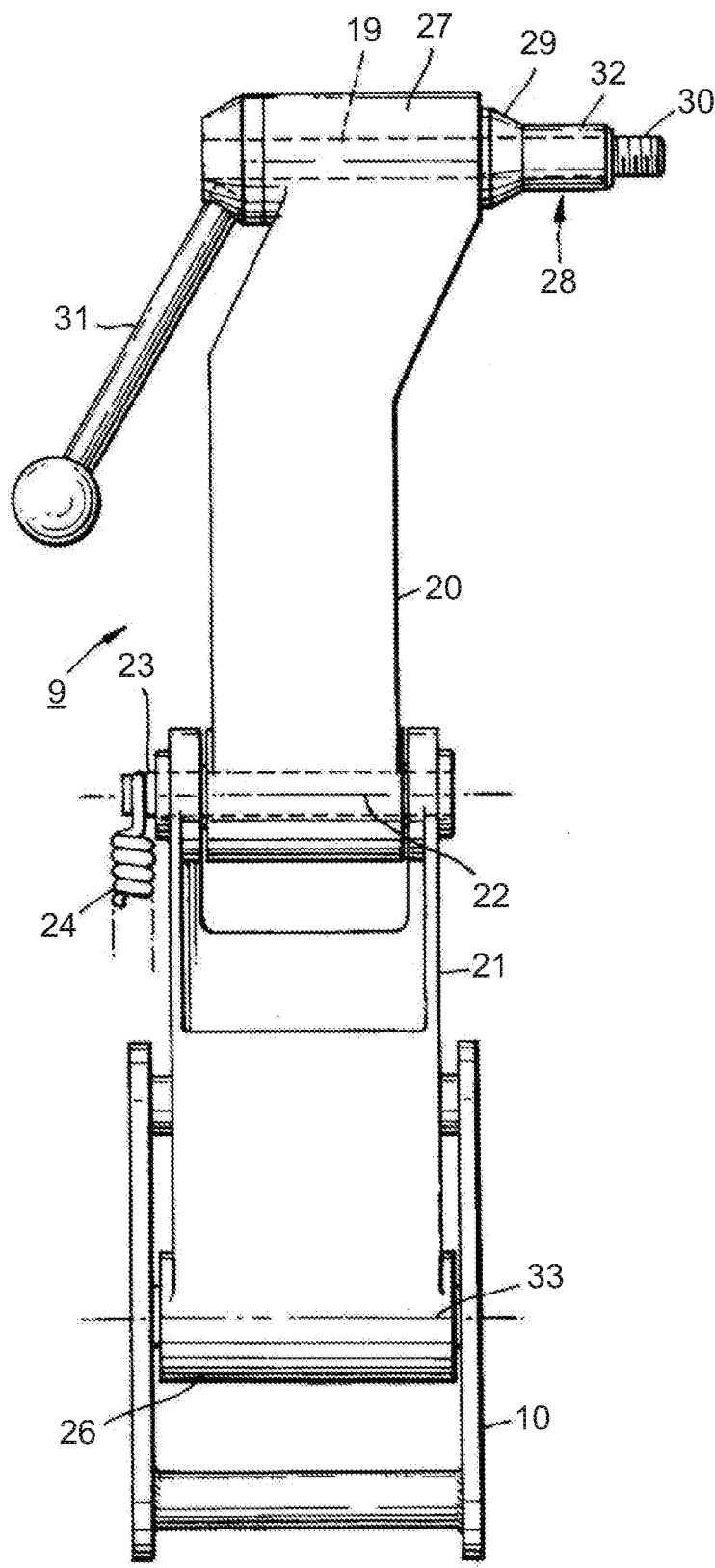
FIG. 2 shows a plan view of a holder which, in a slightly modified embodiment (straight), is included in the apparatus according to FIG. 1.

The holder 9 comprises two arms, namely a rear arm 20 and a front arm 21, which are rotatably connected to each other by means of a toggle joint 22. The free end of the rear arm 20 comprises a bearing housing 27, as shown in FIG. 2, in which a shaft or spindle 19 is mounted, axially immovable. An extension piece 28 on the spindle 19 extends in the direction towards the machine. This extension piece 28 consists of a threaded point 30, a cylindrical section 32 and a conical section 29 nearest the bearing housing 27. On the other side of the bearing housing 27, the spindle 19 is provided with a handle 31, by means of which the spindle 19 can be turned in the bearing housing 27 when the extension piece 28 of the spindle is to be anchored in either of the spindle attachments 7, 8.

At the front end of the front arm 21 of the holder 9 there is a bearing housing 26, and a shaft 33 is rotatably movable in this bearing housing 26. The shaft 33 is secured, at both its ends, in a securing device 10 which can be secured on the rail 11 with the aid of a screw 25. A helical spring 24 extends between the securing device 101 and a pin 23 on the toggle joint 22.

Figure 5:
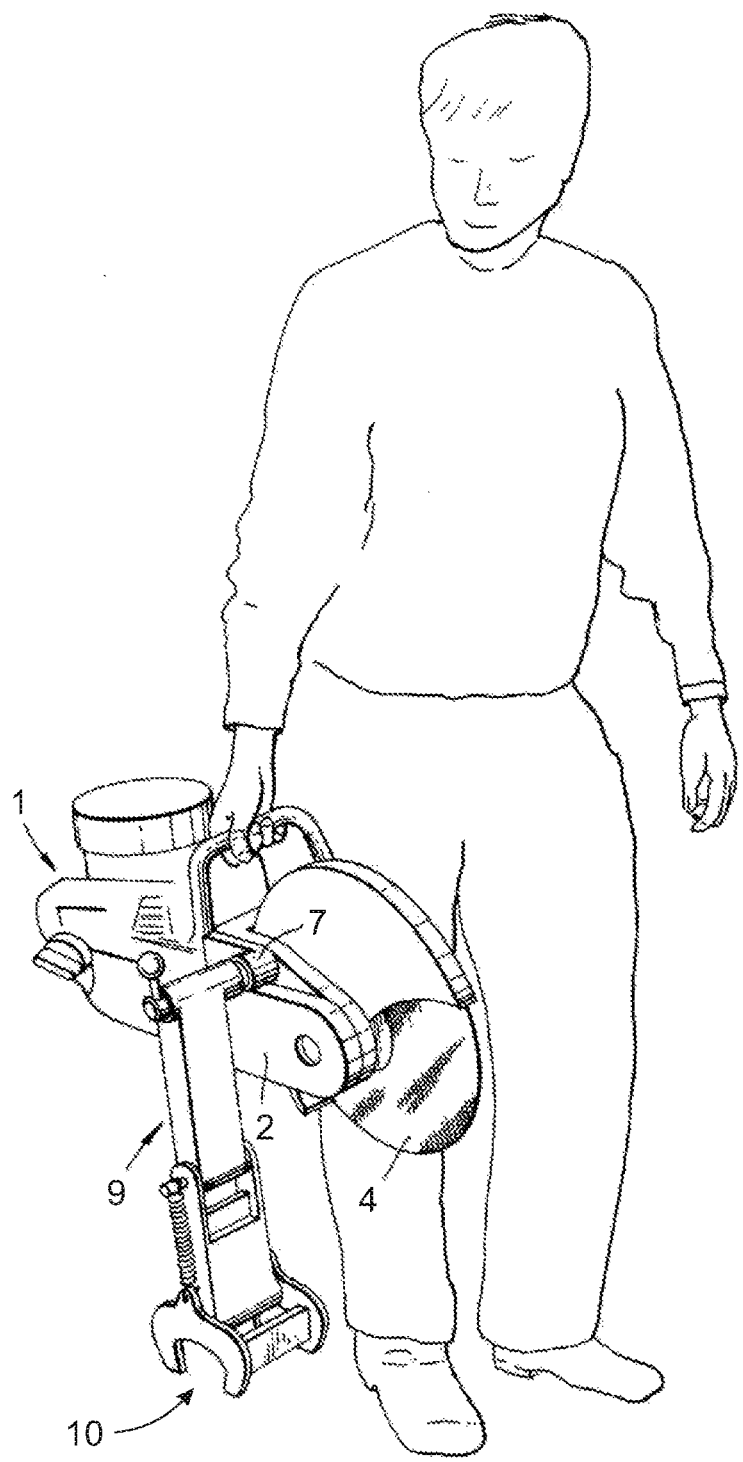
FIG. 5 shows how a cutting machine with an apparatus according to the invention can be carried.

The two spindle attachments 7, 8 are designed identically in order to be able to receive and anchor the projecting extension piece 28 of the spindle 19, and for this reason they have, furthest inside, an internally threaded hole 34 in a steel sleeve 38 for the threaded end-journal 30, a cylindrical section 35 for the cylindrical projecting section 32 of the spindle extension piece, and a conical mouth section 36 for the conical section 29 adjacent to the bearing housing 27. When mounting the holder 9 onto the machine 1, the threaded end 30 on the spindle extension piece 28 is screwed into the threaded hole 34 in one of the spindle attachments 7, 8 with the aid of the handle 31 until the conical section 29 on the spindle extension piece 28 engages with the conical mouth section 36 in one of the spindle attachments 7, 8. The rear arm 20 of the holder can then be turned in the bearing housing 27 about the spindle 19 situated in the bearing housing and anchored in the machine, the centre line of which spindle 19 coincides with the centre line 18 intersecting the cutting wheel 4 above the cutting arm 2 and, thus, also above the drive belt or equivalent 3, that is to say comparatively high up on the machine. This means that the machine 1 can be carried by the handle, with the holder 9 mounted in the machine, without the holder 9 or its securing device 10 dragging along the ground, at least not when the securing device 10 consists of a screw vice or equivalent, with comparatively small dimensions. This is illustrated in FIG. 5. By means of the positioning of the spindle attachments 7, 8, the integrated unit also becomes well-balanced, which also makes it easier to carry, as does the fact that the holder 9 can be made considerably lighter than known equivalent constructions.

The attachment 8 is slit in FIG. 4A, which permits a possibility of axial adjustment of the sleeve 38. In this way it is possible to compensate for different thicknesses of different cutting wheels 4 or saw blades when it is intended, for instance, to cut an object, for example a railroad rail, and to do half the cut from each side in order to compensate largely for intolerances in the construction, and where it is desired that the saw cuts from both directions should meet and coincide with great precision.

FIG. 5 shows how a cutting machine with an apparatus according to the invention can be carried. In this carrying position the holder 9 will hang straight down and the helical spring 24 extending between the securing device 10 and a pin 23 on the toggle joint will hold the securing device 10 in the position indicated.

Figure 6:
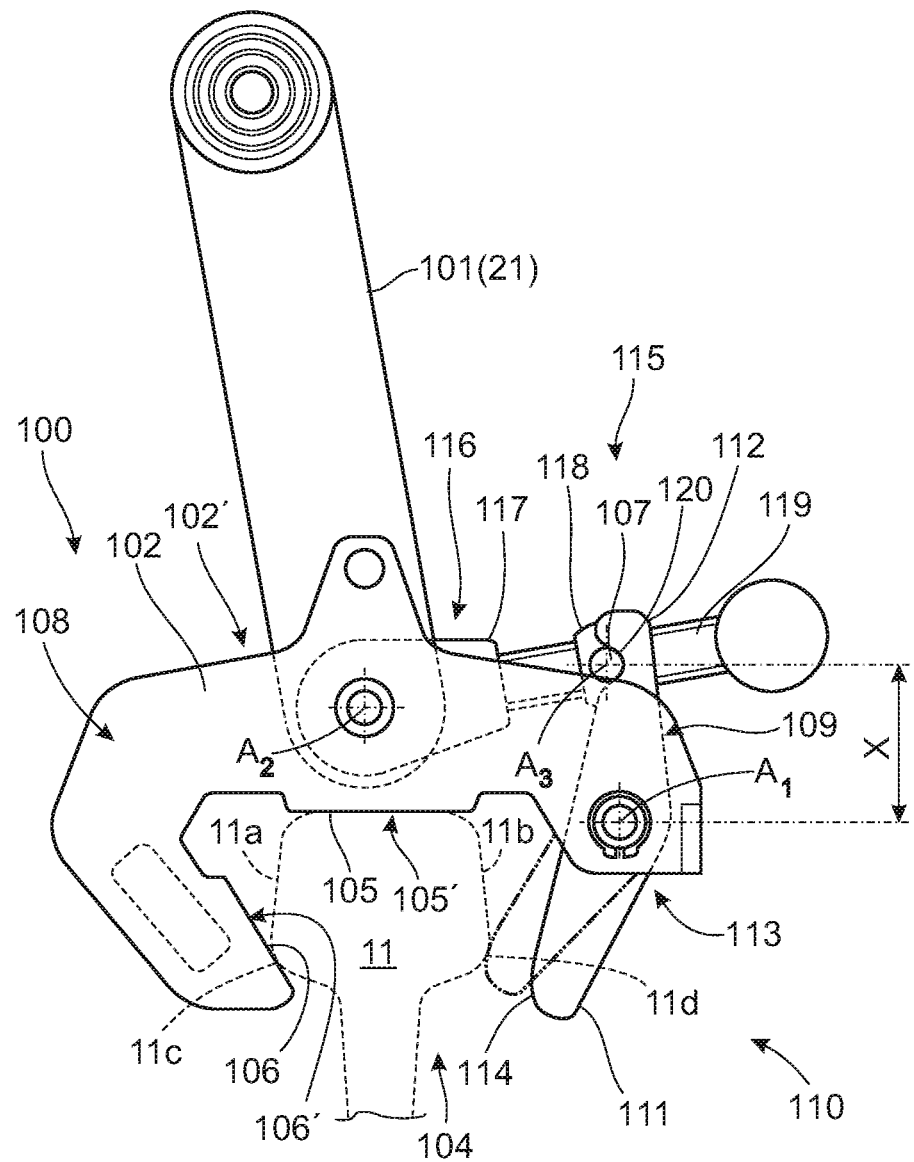
FIG. 6 shows a schematic side view of a securing device according to the invention.
Figure 7:
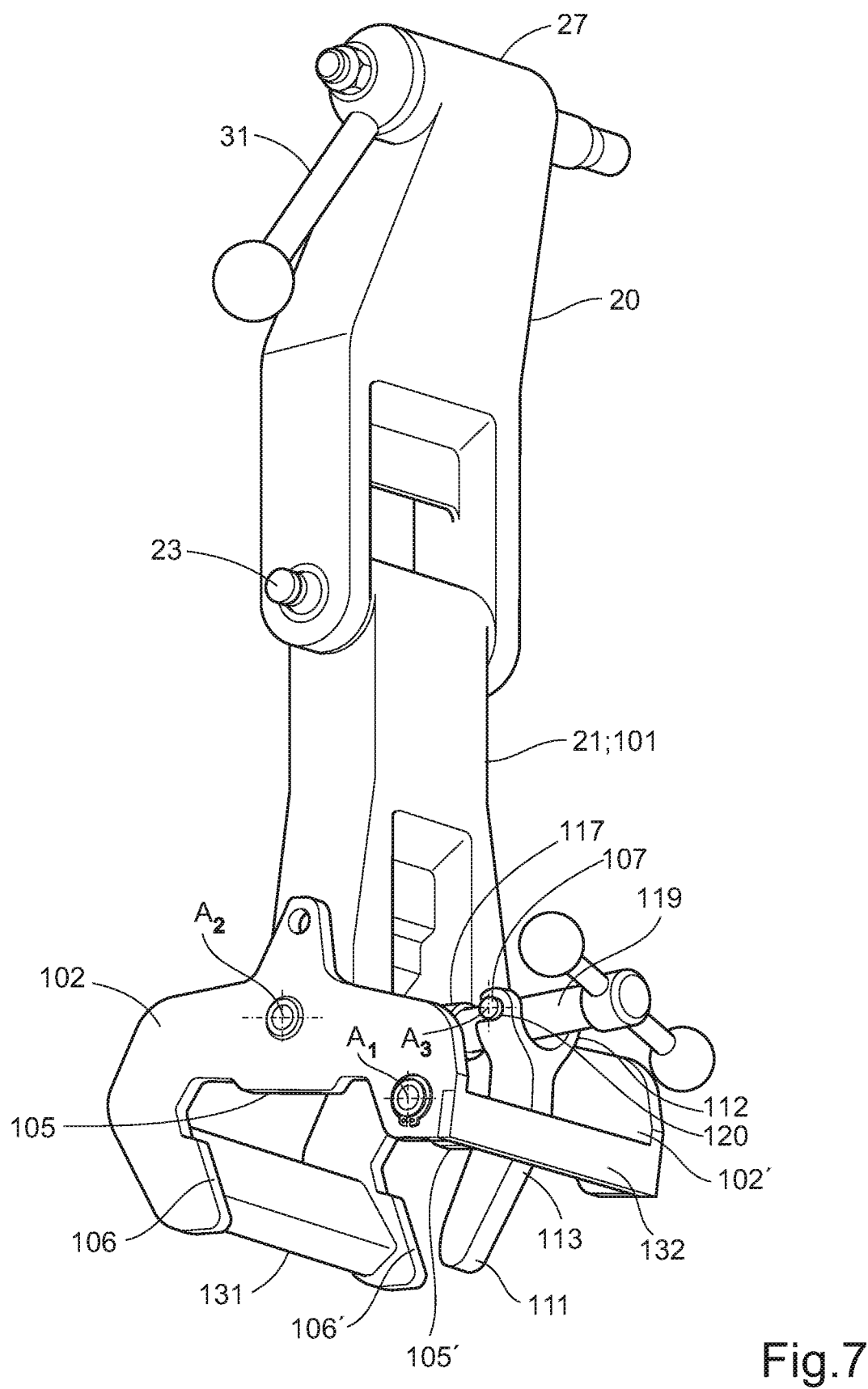
FIG. 7 shows a schematic perspective view of the securing device in FIG. 6 attached to arms for supporting a cutting device.

FIGS. 6 and 7 show a securing device connected to a cutting machine and a holder 9 similar to the ones shown in FIGS. 1-5. FIG. 6 shows a schematic side view of a securing device arranged to secure a portable cutting machine on an elongated profiled object 11 (indicated in dashed lines), in this case a railway rail. The securing device comprises a base 100 adapted to be disposed on an upper surface of the profiled object 11 and an arm 101 (see FIG. 1; "arm 21") pivotably mounted to the base 100 at right angles to the main extension of the object 11. The base comprises two parallel, spaced plates 102, 102' with an opening 104 for receiving the object 11. Each plate 102, 102' comprises a central, first contact surface 105, 105' arranged to contact the upper surface of the object 11 and a second inwardly angled contact surface 106, 106' extending from a first end 108, 108' of the respective plate towards a corresponding side surface 11a of the object 11.

In this example the first end 108, 108' of said plates each form a relatively stationary jaw that partially embraces the object 11, in this case a rail head. The jaws extend transversely across the object 11 and comprise a side portions surrounding one side 11a of the rail head 11. The respective second inwardly angled contact surfaces 106, 106' extend from below into contact with a first lower edge 11c of the rail head 11.

The base 100 further comprises a rocker arm 110 having a first end 111 and a second end 112, connected by a central portion 113. The rocker arm is mounted pivotable about a first axis A1 at right angles to the parallel plates 102, 102' between a second end 109, 109' of each plate, which first pivot axis A1 is arranged through the central portion 113 of the rocker arm 110. The first end 111 of the rocker arm 110 comprises a third contact surface 114 opposed to the respective second contact surfaces 106, 106' on the respective plate 102, 102', which third contact surface 114 extends towards a corresponding opposed side surface 11b of the object 11. The third contact surface 114 of the rocker arm 110 is arranged to be displaced towards the opposed second contact surfaces 106, 106' to clamp the object 11.

In this example the rocker arm 110 forms a movable clamping jaw with a third clamping surface 114 intended to extend from below into contact with a second lower edge 11d of the rail head 11, opposite the first lower edge 11c.

A clamping device 115 is provided for actuating the rocker arm 110, where a first end 116 of the clamping device is mounted pivotable about a second axis A2 at right angles to the parallel plates 102, 102' between their first and second ends 108, 108' and 109, 109', respectively. The second end 112 of the rocker arm 110 is journalled about a pivot 107 on the clamping device 115, which pivot 107 is located on a third axis A3 parallel to and remote from the second axis A2.

In this example, the clamping movement of the movable clamping jaw 110 in relation to the rail 11 is applied by the clamping device 115. At this point the central, first contact surface 105, 105' is in contact with the upper surface of the profiled object 11 and the second inwardly angled contact surface 106, 106' can be moved into contact with the first lower edge 11c of the rail head. The rocker arm 110 with its third clamping surface 114 is pivoted by the clamping device 115 into contact with the second lower edge 11d of the rail head. It should be noted that the clamping forces towards the lower edges 11c, 11d are directed in a combined both lateral and vertical direction. Each of these forces will act in a direction of appr. 45 degrees (30-60 degrees) towards the first contact surface. Hereby the base is strongly centered around the profiled object 11. In this way the securing device is securely fixed and accurately located in a desired position at right angles to the intended cut. This arrangement also allows the securing device to adapt itself to objects such as rails with different rail head widths. Further it should be noted that the rocker arm 110 is arranged in between the two parallel plates 102, 102' at a distance to the closest plate being more than 30%, and preferably more than 40%, and most preferably being 50%, of the total distance between the plates. So there are two contact points with the first lower edge 11c and one contact point with the opposite second lower edge 11d, being located halfway between the two other contact points, but opposite. This 3 point system creates a very strong self centerring action and a very stable position for the base 100.

As indicated in FIG. 6, the second end 112 of the rocker arm 110 is releasably mounted to the pivot 107 of the clamping device 115. A semi-circular recess 120 is provided in the second end 112 of the rocker arm facing the pivot. The pivot 107 on the clamping device 115 has a cylindrical section, so that it conforms to the shape of the recess 120. According to this example, the clamping device 115 is provided with one pivot 107 on either side, arranged to cooperate with a pair of recesses located on a forked portion of the second end of the rocker arm (see FIG. 7), which forked portion can extend on both sides of the clamping device. For reasons of clarity, only one pivot is described in the text. An advantage of this arrangement is that the clamping device 115 only needs to be released a distance corresponding to the depth of the recess in order to release the apparatus from the object. When the pivot 107 on the clamping device clears the recess, the clamping device is pivoted upwards about the second axis A2. The rocker arm can then be swung aside, allowing it to be rotated to clear the object as the apparatus is removed.

The end of the clamping device 115 proximate the second axis A2 is mounted to an attachment 117 pivotable about the second axis A2. The clamping device 115 comprises an actuator arranged to displace the rocker arm pivot 107 relative to the second axis A2. The actuator shown in FIG. 6 comprises a rotatable screw 119 arranged to displace the second end 112 of the rocker arm 110. This displacement forces the third contact surface 114 at the first end 111 of the rocker arm 110 into contact with the object 11. The screw 119 is arranged in a tubular member 118 comprising the pivot 107 for the second end 112 of the rocker arm. The screw 119 is arranged to cooperate with the tubular, internally threaded member 118. When the second end 112 of the rocker arm 110 is in contact with the pivot 107 on the tubular member 118, rotation of the screw 119 causes a relative axial displacement of the tubular member 118 along the screw 119.

Alternatively, the actuator can comprise a piston-cylinder arrangement. In this case, the cylinder can comprise the pivot 107 for the second end 112 of the rocker arm 110.

The arm 101 and the clamping device 115 are pivotable about the second axis A2. The arm (101) has a free end that provides an attachment point, such as a toggle joint 22 (FIG. 2), for the cutting machine (1). In this example, the arm 101 and the clamping device are both mounted to and pivotable about the second axis A2. The second axis A2 is located adjacent the first contact surface 105, 105' at a distance, measured at right angles from said surface, not greater than the distance X between the first and third axes A1, A3 when the pivot 107 is located in the recess 120.

FIG. 7 shows a schematic perspective view of the entire holder 9 securing device in FIG. 6 attached to a rear arm 20 and a front arm 21 (see FIG. 1) for supporting a cutting device. The front arm 21 corresponds to the arm 101 shown in FIG. 6. The free end of the rear arm 20 comprises a bearing housing 27, as shown in FIGS. 1 and 2. A handle 31 is provided on one side of the bearing housing 27, which can be turned in the bearing housing 27 for attaching of detaching a cutting machine (not shown). The rear arm 20 and the front arm 21 are rotatably connected to each other by means of a toggle joint 22. The front arm 21, 101 is pivotably mounted to the base 100 of the securing device. The base comprises two parallel, spaced plates 102, 102' which are separated by a first and a second spacer 131, 132.

As indicated in FIG. 6, the second end 112 of the rocker arm 110 is releasably mounted to the pivot 107 (one shown) on either side of the clamping device 115. According to this example, the clamping device 115 is provided with a tubular member 118 having one pivot 107 on either side of the tubular member 118 (see FIG. 6), which pivots 107 are arranged to cooperate with a pair of recesses located on a forked portion of the second end 112 of the rocker arm (see FIG. 7), which forked portion partially encircles both sides of the clamping device 115. The pivots 107 on the clamping device 115 have a cylindrical cross-section, so that they conform to the shape of the recesses 120.

An advantage of this arrangement is that the clamping device 115 only needs to be released a distance corresponding to the depth of the recesses 120 in order to release the apparatus from the object. When the pivots 107 on the clamping device clear the recesses, the clamping device is pivoted upwards about the second axis A2. The rocker arm 110 can then be swung aside, allowing it to be rotated to clear the object as the apparatus is removed. For instance, if the depth of the recesses is selected to be equal to half the diameter of the pivots, then the securing device can be released after only a few turns of the screw 119.

In operation, a system comprising a cutting machine and a securing device as described above is held as indicated in FIG. 5 and is lowered onto a rail to be cut at a set position. The first contact surface 105, 105' is placed in contact with the upper surface of the object 11 and the second inwardly angled contact surface 106, 106' is placed in contact with its corresponding side surface 11a of the object 11. If necessary, the securing device is displaced along the rail until the cutting machine is positioned correctly. The rocker arm 110 is then pivoted about the first axis A1, moving its first end 111 towards its corresponding side surface 11b of the rail, until the clamping device can be pivoted about the second axis A2 past the second end 112 of the rocker arm 110. The pivot 107 on the clamping device 115 is aligned with the recess 120 and the clamping device 115 is actuated to bring the pivot 107 into contact with the recess. Continued actuation of the clamping device 115 will force the first contact surface 114 into contact with the rail (see FIG. 6; dash-dotted lines) and secure the system onto the rail. Once secured, the cutting machine is actuated to perform a cutting operation. Subsequently, the above steps are performed in reverse to release the system from the rail.

The invention should not be deemed to be limited to the embodiments described above, but rather a number of further variants and modifications are conceivable within the scope of the following patent claims.

The invention claimed is:

1. An apparatus arranged to secure a portable cutting machine on an elongated railshaped profiled object, the apparatus comprising:
    a base adapted to be disposed on an upper surface of the elongated railshaped profiled object; and
    an arm pivotably mounted to the base at a first pivot axis at right angles to a main extension of the elongated railshaped profiled object;
    wherein the base comprises:
        two parallel, spaced plates, each plate having an opening for receiving the object;
        a rocker arm; and
        a clamping device for actuating the rocker arm;
    wherein each plate comprises a central, first contact surface arranged to contact the upper surface of the elongated railshaped profiled object, the central, first contact surface being located between a first end and a second end of each plate;
    wherein a second inwardly angled contact surface extends from the first end of each plate towards a corresponding first side surface of the elongated railshaped profiled object, the second inwardly angled contact surface arranged to contact a first lower edge of a rail head of the elongated railshaped profiled object;
    wherein the rocker arm is pivotally mounted at a location between and spaced apart from an interior surface of each of the plates about a second pivot axis and is configured to rotate about the second pivot axis;
    wherein the rocker arm comprises a first end, a central portion, and a second end;
    wherein the first end of the rocker arm defines a third contact surface, the third contact surface extending towards a corresponding second side surface of the elongated railshaped profiled object to clamp the elongated railshaped profiled object;
    wherein a first end of the clamping device is pivotally mounted to the base and the arm at the first pivot axis between the parallel, spaced plates, wherein the arm is pivotable relative to the clamping device about the first pivot axis;
    wherein the second end of the rocker arm is journaled on the clamping device about a third pivot axis;
    wherein the first, second, and third pivot axes are different; and
    wherein the first pivot axis, the second pivot axis, and the second inwardly angled contact surface remain in fixed relative positions during movement of the base relative to the arm and movement of the rocker arm relative to the base.

2. The apparatus according to claim 1, wherein the second end of the rocker arm is releasably mounted to the third pivot axis on the clamping device.

3. The apparatus according to claim 1, wherein a second end of the clamping device comprises an actuator arranged to, upon actuation of the actuator:
    displace the third pivot axis and the second end of the rocker arm relative to the first pivot axis and the arm;
    rotate the rocker arm about the second axis and relative to the parallel spaced plates due to the rocker arm being journaled on the clamping device at the third pivot axis; and
    rotate the clamping device relative to the arm about the first pivot axis.

4. The apparatus according to claim 3, wherein the actuator comprises a screw arranged to displace the third pivot axis and the second end of the rocker arm.

5. The apparatus according to claim 4, wherein the screw is arranged in a tubular member comprising the third pivot axis for the second end of the rocker arm.

6. The apparatus according to claim 1, wherein the first pivot axis is located adjacent to the central, first contact surface of each of the two parallel, spaced plates at a distance not greater than the distance between the second pivot axis and the third pivot axis.

7. The apparatus according to claim 1, wherein the arm has a free end opposite from the first pivot axis that provides an attachment point for a second, rear arm, the second, rear arm providing an attachment point for the cutting machine.

8. The apparatus according to claim 1, wherein a distance from the rocker arm to one of the plates is more than 30% of the total distance between the two parallel, spaced plates.

9. The apparatus according to claim 8, wherein the distance from the rocker arm to one of the plates is more than 40% of the total distance between the two parallel, spaced plates.

10. The apparatus according to claim 1, wherein the third pivot axis moves in an arcuate path relative to the second pivot axis.

11. A system for cutting an elongated railshaped profiled object, the system comprising:
    a cutting machine comprising a cutting wheel or a saw blade configured to cut the elongated railshaped profiled object; and
    a securing device configured to be connected to the cutting machine, the securing device comprising:
        a base adapted to be disposed on an upper surface of the elongated railshaped profiled object; and
        an arm pivotably mounted to the base at a first pivot axis at right angles to a main extension of the elongated railshaped profiled object;
        wherein the base comprises:
            two parallel, spaced plates, each plate having an opening for receiving the object;
            a rocker arm; and
            a clamping device for actuating the rocker arm;
        wherein each plate comprises a central, first contact surface arranged to contact the upper surface of the elongated railshaped profiled object, the central, first contact surface being located between a first end and a second end of each plate;
        wherein a second inwardly angled contact surface extends from the first end of each plate towards a corresponding first side surface of the elongated railshaped profiled object, the second inwardly angled contact surface arranged to contact a first lower edge of a rail head of the elongated railshaped profiled object;
        wherein the rocker arm is pivotally mounted at a location between and spaced apart from an interior surface of each of the plates about a second pivot axis and is configured to rotate about the second pivot axis;

wherein the rocker arm comprises a first end, a central portion, and a second end;

wherein the first end of the rocker arm defines a third contact surface, the third contact surface extending towards a corresponding second side surface of the elongated railshaped profiled object to clamp the elongated railshaped profiled object;

wherein a first end of the clamping device is pivotably mounted to the base and the arm at the first pivot axis between the parallel, spaced plates, wherein the arm is pivotable relative to the clamping device about the first pivot axis;

wherein the second end of the rocker arm is journaled on the clamping device about a third pivot axis;

wherein the first, second, and third pivot axes are different; and wherein the first pivot axis, the second pivot axis, and the second inwardly angled contact surface remain in fixed relative positions during movement of the base relative to the arm and movement of the rocker arm relative to the base.

12. The system according to claim 11, wherein the second end of the rocker arm is releasably mounted to the third pivot axis on the clamping device.

13. The system according to claim 11, wherein a second end of the clamping device comprises an actuator arranged to, upon actuation of the actuator:

displace the third pivot axis and the second end of the rocker arm relative to the first pivot axis and the arm;

rotate the rocker arm about the second axis and relative to the parallel spaced plates due to the rocker arm being journaled on the clamping device at the third pivot axis; and rotate the clamping device relative to the arm about the first pivot axis.

14. The system according to claim 13, wherein the actuator comprises a screw arranged to displace the third pivot axis and the second end of the rocker arm.

15. The system according to claim 14, wherein the screw is arranged in a tubular member comprising the third pivot axis for the second end of the rocker arm.

16. The system according to claim 11, wherein the first pivot axis is located adjacent to the central, first contact surface of each of the two parallel, spaced plates at a distance not greater than the distance between the second pivot axis and the third pivot axis.

17. The system according to claim 11, wherein a distance from the rocker arm to one of the plates is more than 30% of the total distance between the two parallel, spaced plates.

18. The system according to claim 17, wherein the distance from the rocker arm to one of the plates is more than 40% of the total distance between the two parallel, spaced plates.

* * * * *